Oct. 16, 1923.
K. O. MUEHLBERG
1,470,635
APPARATUS FOR RESURFACING BEARINGS
Filed May 6, 1921   2 Sheets-Sheet 1
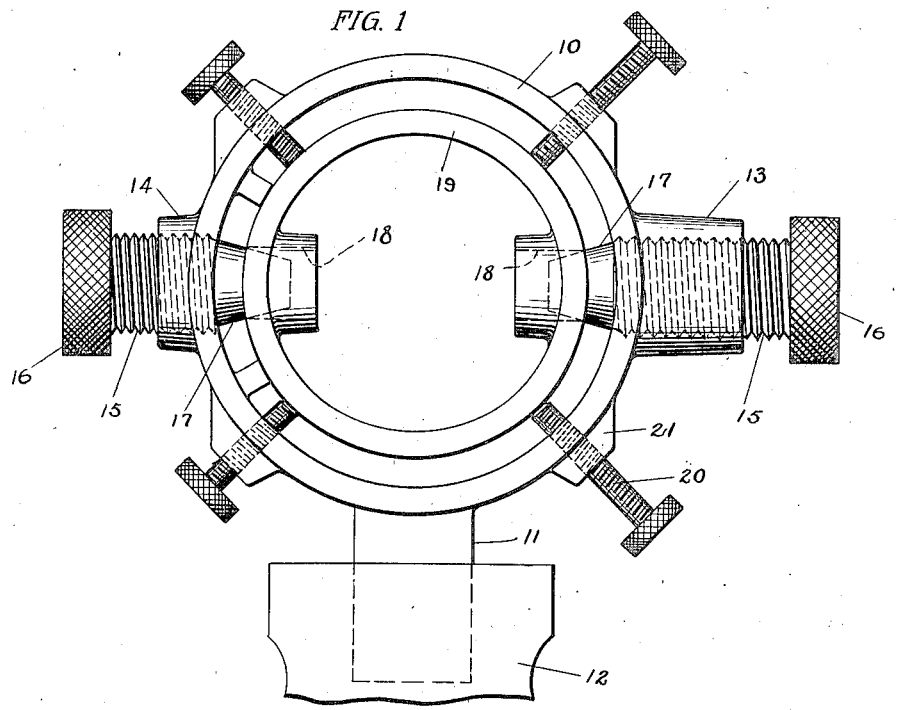
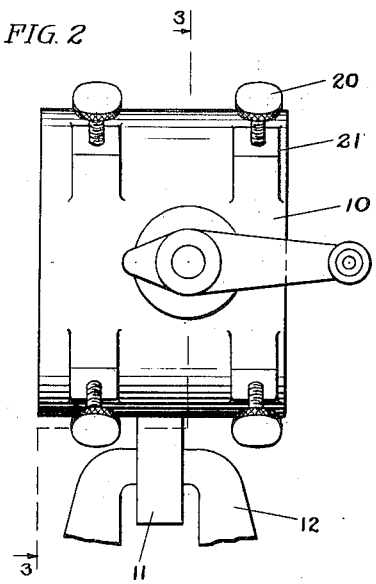
Inventor
Karl O. Muehlberg.
By Morsell & Keeney,
Attorneys

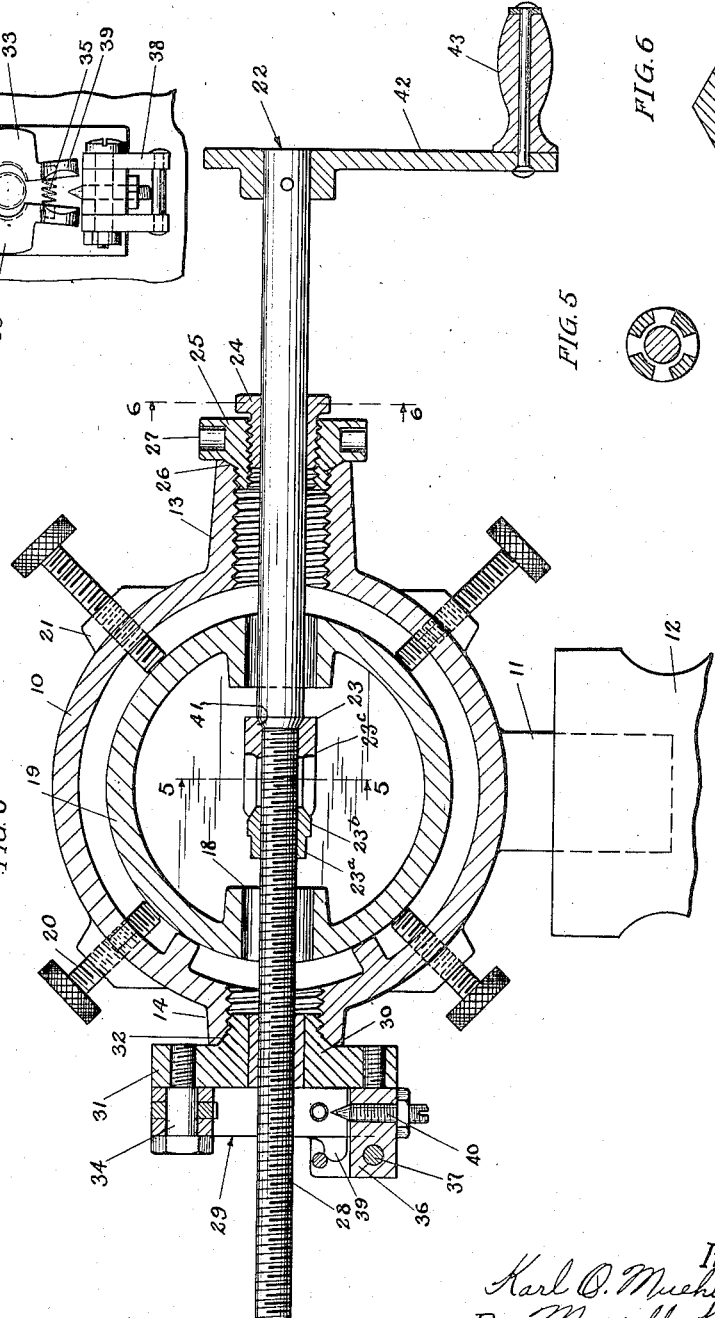

Patented Oct. 16, 1923.

1,470,635

UNITED STATES PATENT OFFICE.

KARL O. MUEHLBERG, OF MANITOWOC, WISCONSIN.

APPARATUS FOR RESURFACING BEARINGS.

Application filed May 6, 1921. Serial No. 467,429.

*To all whom it may concern:*

Be it known that I, KARL O. MUEHLBERG, a citizen of the United States, and resident of Manitowoc, in the county of Manitowoc and State of Wisconsin, have invented new and useful Improvements in Apparatus for Resurfacing Bearings, of which the following is a description, reference being had to the accompanying drawings, which are a part of this specification.

This invention relates to apparatus for resurfacing bearings such as wrist pin bearings in pistons for internal combustion engines.

The primary object of the invention is to provide apparatus for the purpose above specified which will be of simple construction, convenient to operate and which will accurately maintain the resurfacing tool, during the resurfacing operation, in axial alignment in the bearing or bearings to be resurfaced.

The invention contemplates a hollow holding member into which the piston may be inserted and which is provided with oppositely transversely disposed bearing apertures adapted to support the shaft carrying the resurfacing tool, and a further object of the invention is to provide means whereby the piston may be quickly and conveniently positioned in the holding member with the bearings thereof to be resurfaced in axial alignment with the bearing apertures of the holding member.

A further object of the invention is to provide means whereby the shaft carrying the resurfacing tool may be quickly and conveniently initially placed in the holding member so that the resurfacing tool carried thereon will be ready to perform the resurfacing operation when the shaft is rotated without having to take up any lost motion.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a front elevational view of a piston holding member embodying certain features of the invention, with a piston positioned therein;

Fig. 2 is a side elevational view, on a slightly reduced scale, of the parts shown in Fig. 1 and with the resurfacing tool in position in the piston;

Fig. 3 is an enlarged sectional view taken on the line 3—3 of Fig. 2;

Fig. 4 is a detail view of a split nut used in combination with the shaft supporting the resurfacing tool; and Figs. 5 and 6 are sectional views taken on the lines 5—5 and 6—6 of Fig. 3, respectively.

Like characters of reference designate like parts in the several views.

Referring to the drawings it will be seen that the piston holding member 10 is substantially cylindrical and approximately of the length of the piston, the member 10 being provided with a downwardly projecting lug 11 which is adapted to be clamped between the jaws 12 of a vise or the like, The holding member is provided with oppositely transversely extending apertured bosses 13 and 14 which are preferably internally threaded for the reception of threaded plugs 15, the outer ends of which are provided with finger gripping portions 16 and the inner ends 17 of which are tapered substantially, as shown in Fig. 1, so that the plugs may be readily inserted into the oppositely transversely disposed wrist pin bearing apertures 18 of the piston 19. The piston 19 is positioned in the holding member with one side bearing against longitudinally extending ribs 10ª formed on the holding member substantially as shown in Fig. 1.

It will now be apparent that when the plugs 15 are turned inwardly toward each other as far as they will go that the bearings 18 of the piston will be in axial alignment with the apertures of the bosses 13 and 14. In order to maintain the piston in the relationship just mentioned two sets of radially extending set screws 20, see Fig. 2, are threaded through suitable apertured bosses 21, provided on the holding member 10. When these screws are turned so that their inner ends effectively bear against the outer surface of the piston it is securely maintained in the desired relationship with reference to the bosses 13 and 14 of the member 10. With the piston thus effectively held in the holding member the plugs 15 may be removed.

A shaft, designated as a whole by the reference numeral 22, carries a tool, designated as a whole by the reference numeral 23, the latter being adapted to resurface or rebore the wrist pin bearing apertures 18 of the piston when the shaft is rotated.

The rear end of the shaft has a plain surface and that end is maintained in axial alignment in the boss 13 by providing an externally threaded bearing bushing 24 which is adapted to be inserted in an internally threaded bushing 25, the latter being also externally threaded and adapted to be inserted in the boss 13. The outer extremity of the boss 13 is provided with an annular tapered bearing seat 26 which is engaged by a similar bearing seat provided on the bushing 25. The bushing 25 is provided with oppositely disposed recesses 27 in its head for the insertion of a suitable wrench (not shown). The bushing 24 is split, see Fig. 6, and is slightly tapered to compensate for wear and to form a close fitting bearing for the rear end of the shaft 22.

The forward end of the shaft is reduced somewhat in diameter and is provided with screw threads 28 and is in operative engagement with a nut, designated generally by the numeral 29. In order to support the nut with its aperture in axial alignment with respect to the aperture in the boss 14 an externally threaded bushing 30 is inserted in the boss 14 which is provided with a flange 31 on which the nut 29 is supported. The outer extremity of the boss 14 is provided with an annular tapered seat 32 which co-operates with a similar seat provided on the bushing 30. The nut 29 is formed of two parts 33, see Fig. 4, the upper ends of which overlap and are apertured for the insertion of a pivot member 34 which is threaded into the flanges 31 of the bushing 30. The parts 33 are normally held in distended position by a spring 35. A bracket member 36 is threaded into the lower side of the flange 31 of the bushing 30 which member carries a pivot pin 37 on which is swingingly mounted a U-shaped latching member 38, the arms of the latching member 38 being adapted to slide over the forwardly projecting lugs 39 formed on the lower ends of the members 33, when said members are in their closed position. By the arrangement just described the latching member 38 may be released from engagement with the lugs 39 in which case the spring 35 acts to separate the two parts of the nut 29, as clearly shown in Fig. 4. When the parts of the nut are in this position, the shaft 22 may be inserted with the tool 23 ready to commence resurfacing the first bearing aperture of the piston. The two parts of the nut may then be brought into bearing engagement with and locked on the threaded portion of the shaft.

A screw 40 is carried by the bracket member 36, the inner end of which is conically pointed and extends into a conical recess formed in the lower ends of the parts 33 of the nut which arrangement serves to center the nut with relation to the cutting tool so that the parts will be accurately positioned for cutting.

The resurfacing tool is threaded on the threaded portion of the shaft and is provided with an annular tapered seat 41 which is adapted to bear against a similar seat formed on the shaft 22. The cutting tool may be provided with a plurality of cutting edges 23ª, 23ᵇ and 23ᶜ if desired, as shown in Fig. 3, and the difference in diameter between these cutting portions being considerably exaggerated. The shaft is provided with a crank 42 having a handle 43 to facilitate rotation thereof.

I claim:

1. Apparatus of the class described comprising a hollow holding member, a pair of apertured oppositely transversely disposed bosses on said member, adjustable means adapted to position a piston or the like, having oppositely transversely disposed bearing apertures, in said member so that the apertures of the piston are in alignment with the apertures of said bosses, said bosses being internally threaded, a bushing positioned in one and a releasable split nut associated with the other of said bosses, a rotatable shaft positioned in said bushing and having a threaded portion in engagement with said nut, and a resurfacing tool fixed on said shaft for the purpose described.

2. Apparatus of the class described comprising a hollow holding member, a pair of apertured oppositely transversely disposed bosses on said member, means adapted to position a piston or the like, having oppositely transversely disposed bearing apertures, in said member so that the apertures of the piston are in alignment with the apertures of said bosses, the outer extremities of said bosses being formed with annular tapered bearing seats, bushings positioned in said bosses, said bushings having seats co-operating with the seats of said bosses, respectively for centering said bushings, a releasable split nut associated with one of said bushings, a rotatable shaft positioned in said bushing and having a threaded portion in engagement with said nut, and a resurfacing tool fixed on said shaft for the purpose described.

3. Apparatus of the class described comprising a hollow holding member, a pair of apertured oppositely transversely disposed bosses on said member, means adapted to position a piston or the like, having oppositely transversely disposed bearing apertures in said member so that the apertures of the piston are in alignment with the apertures of said bosses, the outer extremities of said bosses being formed with annular tapered bearing seats, said bosses being internally threaded, externally threaded bushings positioned in said bosses, said bushings having seats co-operating with the seats of said bosses, respectively, a nut associated with one of said bushings, a rotatable shaft positioned in said bushings and having a threaded portion in engagement with said nut, and a resurfacing tool fixed on said shaft for the purpose described.

4. Apparatus of the class described comprising a hollow holding member having oppositely transversely disposed apertures, and means adapted to position and retain a piston or the like, having oppositely transversely disposed bearing apertures, in said member so that the apertures of the piston are brought into alignment with the apertures of said member, said means comprising tapered plugs adapted to be inserted into the apertures of said member and then into the apertures of the piston whereby the piston is positioned in said member with its apertures in alignment with those of the member and set-screws on said holder adapted to maintain the piston in such relationship.

5. Apparatus of the class described comprising a hollow holding member having oppositely transversely disposed apertures, and means adapted to position and retain a piston or the like, having oppositely transversely disposed bearing apertures, in said member so that the apertures of the piston are brought into alignment with the apertures of said member, said means comprising tapered plugs adapted to be inserted into the apertures of said member and then into the apertures of the piston whereby the piston is positioned in said member with its apertures in alignment with those of the member and a plurality of set screws on said holder adapted to be brought into bearing engagement with the piston to maintain the latter in such relationship.

In testimony whereof I affix my signature.

KARL O. MUEHLBERG.